United States Patent [19]

Takano et al.

[11] Patent Number: 4,481,877
[45] Date of Patent: Nov. 13, 1984

[54] AUTOMATIC TRANSMISSION FOR FOUR WHEEL DRIVE AUTOMOTIVE VEHICLES

[75] Inventors: Toshio Takano, Hamuramachi; Toshio Kobayashi, Koganei, both of Japan

[73] Assignee: Fuji Jukogyo Kabushiki Kaisha, Tokyo, Japan

[21] Appl. No.: 171,769

[22] Filed: Jul. 24, 1980

[30] Foreign Application Priority Data

Sep. 13, 1979 [JP] Japan .................. 54-117725
Sep. 13, 1979 [JP] Japan .................. 54-117726
Sep. 13, 1979 [JP] Japan .................. 54-117727

[51] Int. Cl.³ .................... B60K 41/02; F16D 43/22
[52] U.S. Cl. ............................... 180/233; 74/864; 74/869; 74/705; 74/15.66; 74/15.88; 192/0.032
[58] Field of Search ............. 192/103 R, 0.032, 0.033, 192/3.58, 3.57; 74/867, 752 A, 752 C, 15.66, 15.69, 15.82, 15.88, 15.86, 866, 868, 869, 878, 695, 720.5, 665 F, 665 G, 665 GA, 674, 705, 733, 645, 863, 864; 180/247

[56] References Cited

U.S. PATENT DOCUMENTS

| | | | |
|---|---|---|---|
| 2,714,936 | 8/1955 | Gregory | 180/247 |
| 2,749,772 | 6/1956 | O'Malley | 180/247 |
| 3,433,319 | 3/1969 | McLean | 180/247 |
| 3,627,072 | 12/1971 | Smirl | 192/3.57 |
| 3,868,869 | 3/1975 | Hunt et al. | 74/752 A |
| 3,895,542 | 7/1975 | Miyauchi | 74/868 |
| 3,963,085 | 6/1976 | Vinton | 180/247 |
| 3,988,951 | 11/1976 | Mair et al. | 74/869 |
| 4,138,906 | 2/1979 | Nakao et al. | 74/674 |
| 4,236,595 | 12/1980 | Beck et al. | 180/247 |
| 4,275,608 | 6/1981 | Brancolini | 74/665 GA |

Primary Examiner—Allan D. Herrmann
Assistant Examiner—Joseph M. Rolnicki
Attorney, Agent, or Firm—Martin A. Farber

[57] ABSTRACT

An automatic transmission for a four wheel drive automotive vehicle comprising a torque converter, an automatic transmission connected to a turbine shaft of the torque converter for transmitting the output of the engine to the front-wheel, a fluid operated clutch for transmitting the output to the rear-wheel, and a pressure oil control for operating the automatic transmission. The pressure oil control includes a pressure regulator valve to produce a line pressure according to the operational condition of the engine and a valve for the clutch. The pressure oil control means is so arranged that the line pressure is raised with increase of load of the engine, and the valve is adapted to operate the clutch by the raised line pressure, such that the automatic transmission is automatically changed to the four wheel drive in accordance with the driving condition.

9 Claims, 5 Drawing Figures

AUTOMATIC TRANSMISSION FOR FOUR WHEEL DRIVE AUTOMOTIVE VEHICLES

BACKGROUND OF THE INVENTION

The present invention relates to an automatic transmission for an automotive vehicle for driving front and rear wheels, and more particularly to an automatic transmission of the trans-axle type which is adapted to drive either two-wheels or four-wheels.

In recent years, the front wheel drive automobile in which the engine is mounted in a front position of the vehicle has been widely used, because of light weight and a safe steering operation. Further, there has been provided a front wheel drive automobile with an automatic transmission, in which the automatic transmission is integrally assembled with the final reduction gear for the front wheel drive.

It occasionally is difficult to drive the two-wheel drive vehicle at a low speed under a heavy load in such driving conditions as a rapid starting, rough road driving or steep slope climbing. To eliminate such a defect, there has been provided an automobile having a transmission and a clutch adapted to drive either the front two-wheels or both of the front and rear four-wheels, in which the rear wheels are driven through a clutch means. Since the clutch means is a dog clutch operation for coupling the clutch must be performed in a stopped state of the vehicle or in a straight-forward driving state where no rotational difference between the front and rear wheel exists. In an automatic transmission for the rear-wheel drive, a shift lever for the clutch means must be operated, after the select lever of the transmission has been shifted to the neutral position (N) or the parking position (P) for cutting off the power. Accordingly, manipulation of the levers is complicated, which means a decrease in the utility of the automatic transmission. Therefore, it is desirable that the front wheel drive is automatically changed to the four-wheel drive in accordance with driving condition. Further, the four-wheel drive is desirable during rearward driving, on a slope and a rough road.

SUMMARY OF THE INVENTION

The present invention has an object to provide an automatic transmission having a pressure-oil operated multiple-disk clutch for the rear-wheel drive, whereby the change between the front-wheel drive and the four-wheel drive can be performed according to various driving conditions of the automotive vehicle and further the clutch may be automatically operated by the pressure oil used in the automatic transmission in accordance with the driving condition of the vehicle.

With the above and other objects and advantages in view, the present invention will become more clearly understood in connection with the detailed description of preferred embodiments, when considered with the accompanying drawings, of which:

DESCRIPTION OF THE PREFERRED EMBODIMENTS

Figure 1A:
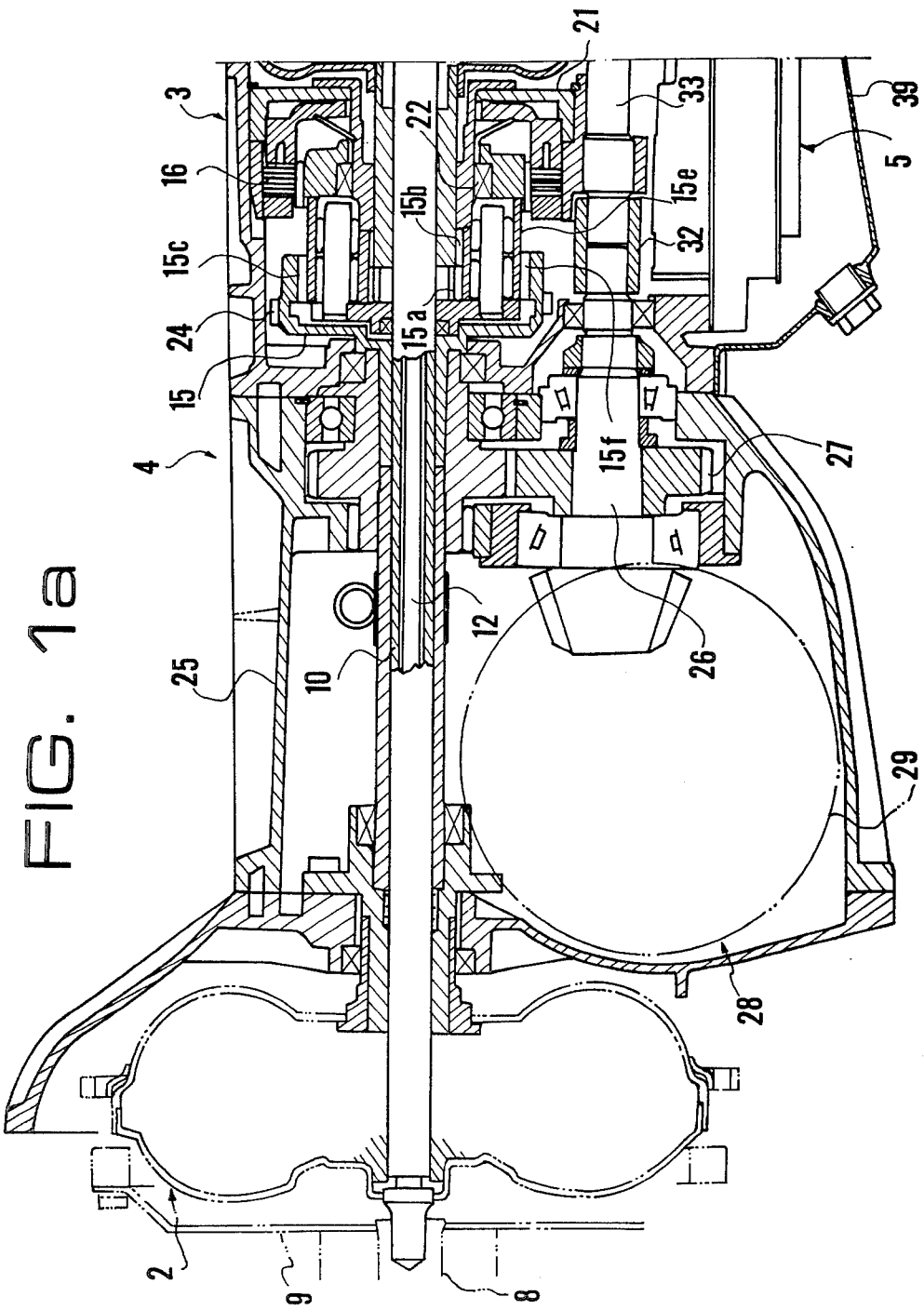
FIGS. 1a and 1b are a sectional view of a four-wheel driving automatic transmission according to the present invention.
Figure 1B:
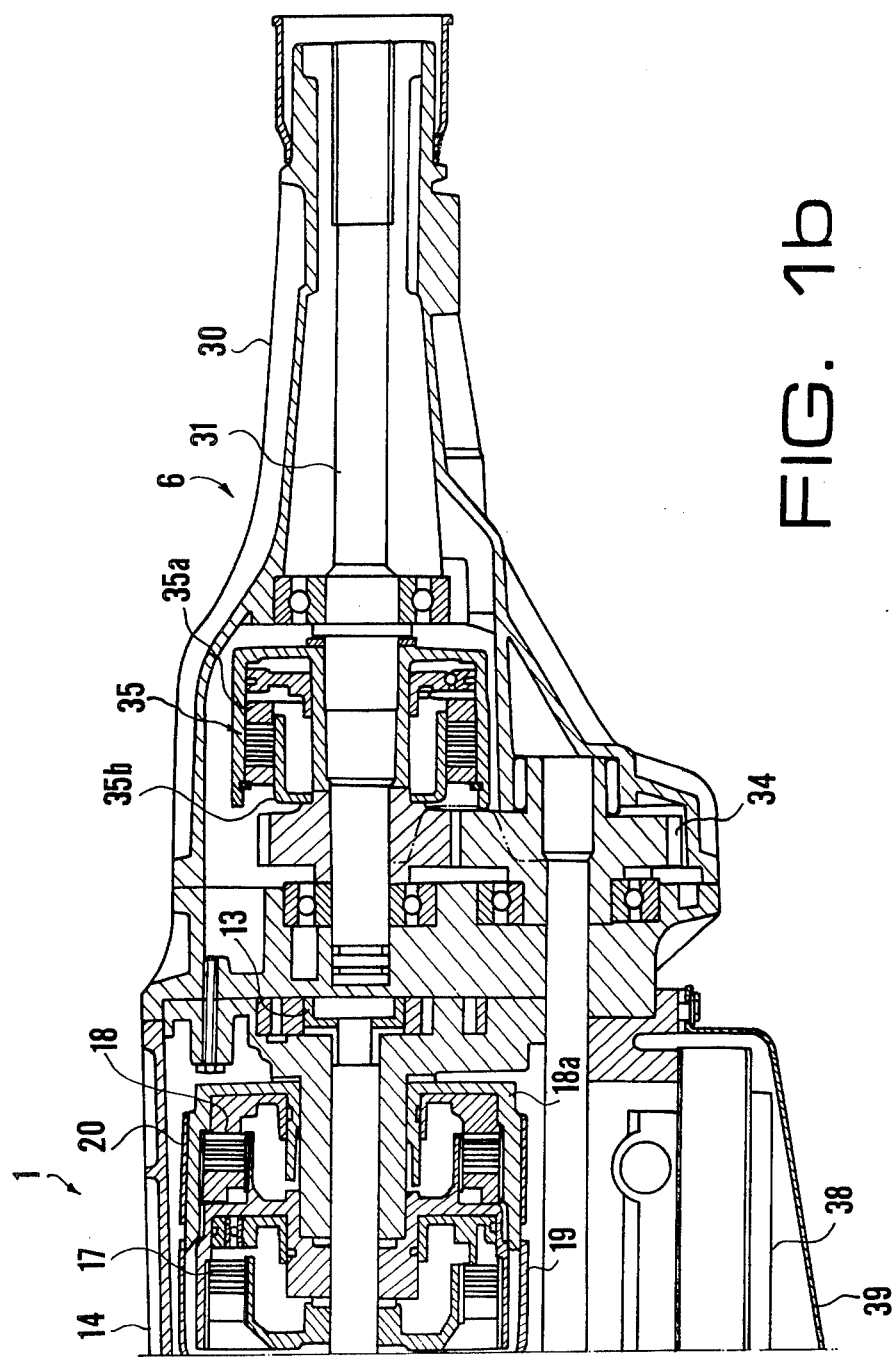
Figures 2, 4:
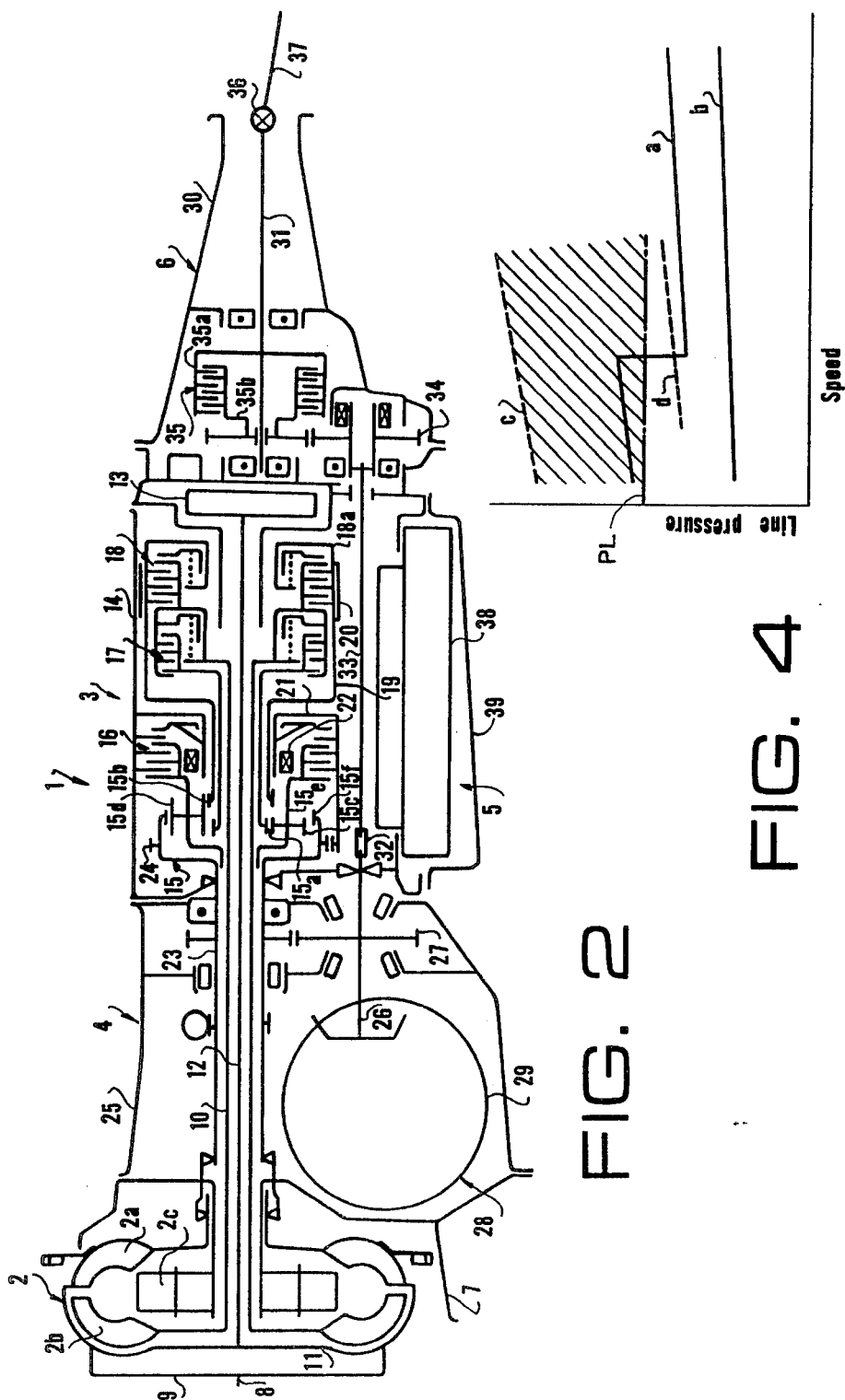
FIG. 2 is a schematic illustration of the transmission of FIG. 1.
FIG. 4 is a graph showing a relation between speed of a vehicle and line pressure in the circuit of FIG. 3.

Referring to FIGS. 1a, 1b and 2, numeral 1 generally designates an automatic transmission which comprises a torque converter 2, an automatic transmission means 3, a final reduction gear 4 and a pressure oil control means 5 for pressure oil. In accordance with the present invention, a multiple-disk clutch means 6 is attached to the rear portion of the automatic transmission means 3.

The torque converter 2 comprises an impeller 2a, a turbine 2b and a stator 2c. The impeller 2a is connected to a crank shaft 8 of an engine through a drive plate 9 and a turbine shaft 10 of the turbine 2b extends to the automatic transmission means 3. As well known, power of the engine is transferred to the turbine shaft 10 according to the load. A cover 11 secured to the drive plate 9 is connected to an oil pump-driving shaft 12 which passes through the turbine shaft 10 and is coupled to an oil pump 13 provided in a rear portion of the automatic transmission means 3. Thus, the oil pump 13 is driven by the engine.

The automatic transmission means 3 comprises a planetary gear 15 and a plurality of fluid operated means for producing various operational ranges. The fluid operated means comprises a low and reverse brake 16, a forward clutch 17 and a reverse clutch 18. The turbine shaft 10 is connected to a forward sun gear 15a of the planetary gear 15 by means of the forward clutch 17 and is further connected to a reverse sun gear 15b by means of the reverse clutch 18 and connecting shell 19. By actuating the clutches 17 and 18 with pressure oil, power of the turbine shaft 10 is transmitted to the sun gear 15a or 15b. A brake band 20 is provided on a drum 18a secured to the connecting shell 19 to block the reverse sun gear 15b.

In connection with the planetary gear 15, a short pinion 15c and a long pinion 15d are supported by a carrier 15e on which the low and reverse brake 16 is provided. Between the brake 16 and a center support 21, a one-way clutch 22 is provided. The carrier 15e may be locked by operation of the brake 16 and the one-way clutch 22. The ring gear 15f of the planetary gear 15 is connected to an output shaft 23 mounted on the turbine shaft 10. The planetary gear 15 is also provided with a parking gear 24.

The output shaft 23 is rotatably supported in a case 25 between a housing 7 of the torque converter 2 and a case 14 of the automatic transmission means 3.

The final reduction gear 4 is operatively connected to output shaft 23 in the case 25. The final reduction gear 4 for the front wheel drive comprises a drive pinion 26 and a crown gear 29 of a differential 28. The drive pinion 26 is driven by the output shaft 23 by means of a reduction gear 27.

The clutch means 6 comprises a rear drive shaft 31 rotatably supported in a case 30 and a multiple-disk clutch 25 operated by pressure oil. The multiple-disk clutch 35 comprises a drum 35a secured to the rear drive shaft 31 and a hub 35b connected to a transfer gear 34 by a transfer driven gear. The transfer gear 34 is connected to a shaft 33 coupled to the drive pinion 26 by a joint 32. The rear drive shaft 31 is connected to a propeller shaft 37 through a universal joint 36.

Figure 3:
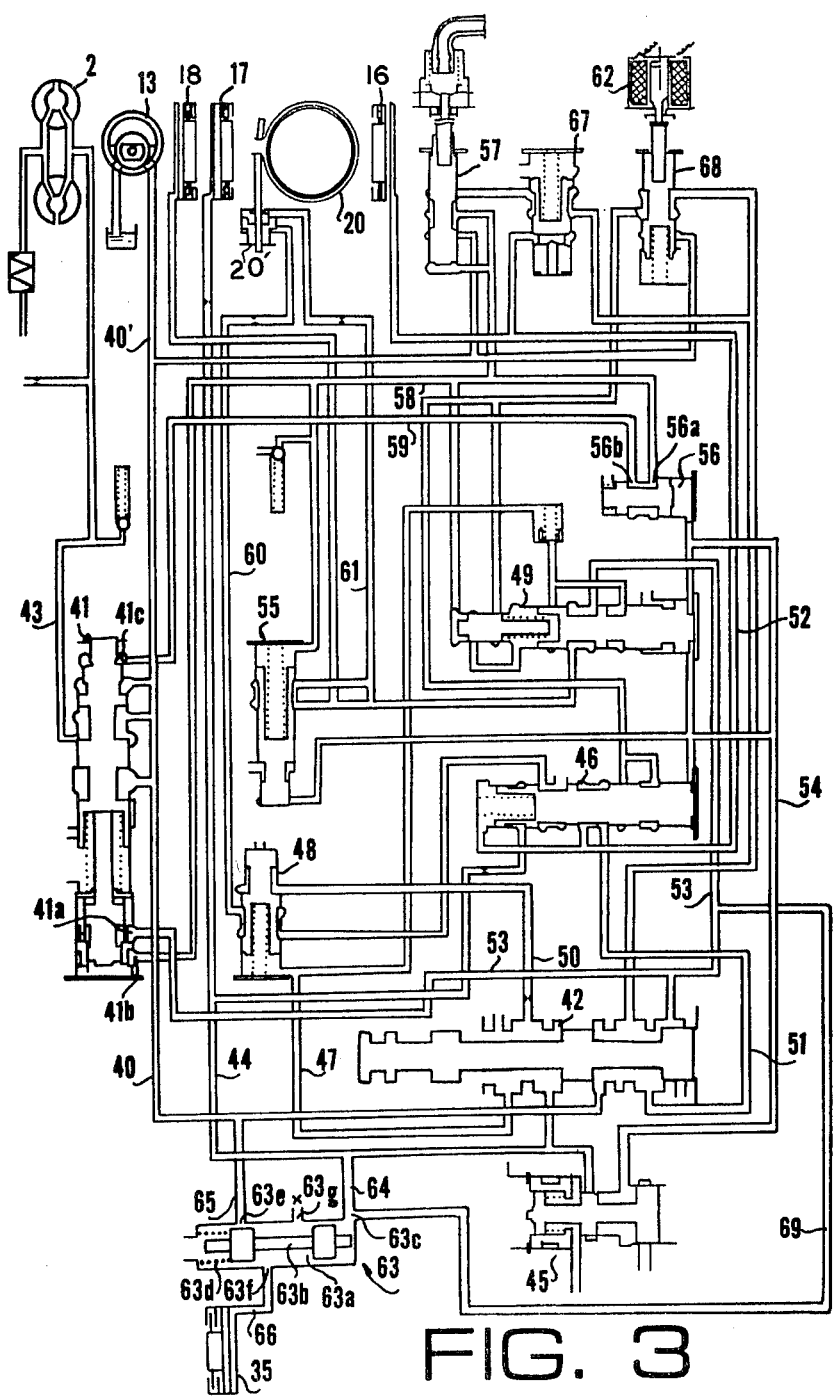
FIG. 3 is a circuit of the pressure oil control means.

The control means 5 is provided in a housing 38 secured in an oil pan 39. Referring to FIG. 3, a conduit 40' from an oil pump 13 is connected to a pressure regulator valve 41 to produce a line pressure in a pressure oil circuit. The line pressure is applied to a manual valve 42 through a line pressure conduit 40 and also applied to the torque converter 2 and to necessary lubricating portions through conduits 43. The manual valve 42 is adapted to change the operational range of the automatic transmission such as the N-range (neutral), P-range (parking), R-range (reverse), D-range (driving 1, 2, 3), 1-range, 2-range. In the D-range, the line pressure is applied via the manual valve 42 (in its position shifted to the right in FIG. 3 (not as shown)) to a governor valve 45, a 1-2 shift valve 46 and the forward clutch 17 through forward drive actuating conduit 44 and is applied to a second lock valve 48 and a 2-3 shift valve 49 through conduits 47, and further is applied to the valve 48 through a conduit 50.

In the R-range, line pressure is applied to the 1-2 shift valve 46 through a conduit 51 to inhibit the operation thereof and further is applied to the low and reverse brake 16 through a conduit 52. The line pressure is also applied to the port 41a of the pressure regulator valve 41 and to the 2-3 shift valve 49 through reverse range conduits 53.

The governor valve 45 is adapted to produce a governor pressure according to the speed of the vehicle. The governor pressure is supplied to shift valves 46 and 49, a 2-3 timing valve 55 and a pressure modifier valve 56 through conduits 54.

Further, the line pressure in the conduit 40 is applied to a vacuum throttle valve 57 operated by a vacuum control diaphragm to produce a throttle pressure according to the load of the engine. The throttle pressure is applied to a port 56a of the pressure modifier valve 56, the 2-3 shift valve 49, the 2-3 timing valve 55 and a port 41b of the line pressure-increasing side of the pressure regulator valve 41. Another port 56b of the pressure modifier valve 56 is connected to a port 41c of the line pressure-decreasing side of the pressure regulator valve 41 by a conduit 59.

When governor pressure is low in the D-range, the pressure modifier valve 56 is not operated so that the throttle pressure acts on the port 41b only to increase the line pressure.

If the pressure modifier valve 56 is actuated on by a higher governor pressure according to an increase of the speed of the vehicle, the ports 56a and 56b communicate with each other so that a throttle pressure is applied to the port 41c of the valve 41 through the conduit 59. The throttle pressure acts on the plunger of the valve 41 against the throttle pressure from the port 41b, so that the line pressure produced by the valve 41 is decreased.

FIG. 4 shows variation of the line pressure in the system. When the throttle valve of the carburetor is fully opened, the line pressure varies as shown by line "a". The line "b" shows the line pressure in a throttle closed condition. It will be seen that the line pressure increases sharply when the speed of the vehicle lowers to a predetermined low speed. In the R-range, governor pressure is not produced from the governor 45 and hence the pressure modifier valve 56 is not operated. Therefore, throttle pressure is applied to the port 41b of the valve 41 and line pressure (from the conduit 40 via the manual valve 42) in the reverse range conduit 53 is applied to the port 41a. Consequently the line pressure does not vary with the variation of vehicle speed as shown by lines "c" and "d" showing the line pressure at full open throttle and closed throttle operation in the reverse driving condition, respectively, but pressure increases in the whole speed range.

Further, the 1-2 shift valve 46 is connected to an apply side of the servo 20' of the brake band 20 through the second lock valve 48 and conduit 60 to apply the line pressure. The 2-3 shift valve 49 communicates with a release side of the servo 20', the 2-3 timing valve 55, and the reverse clutch 18 through conduits 61 to supply the line pressure.

In the above pressure oil circuit for the automatic transmission, a changeover valve 63 is provided to communicate the conduit 40 with the clutch 35. The changeover valve 63 comprises a plunger 63b slidably disposed in a cylinder 63a and urged to the right by a spring 63d. An end port 63c opposite the spring is connected to the conduit 44 through a conduit 64 and a normally closed port 63e is connected to the conduit 40 through a conduit 65. The changeover valve 63 further has a port 63f communicating with the clutch 35 through a conduit 66 and a drain port 63g. The spring 63d is adapted to balance with a line pressure $P_L$ in FIG. 4 higher than "d". That is the line pressure $P_L$ shows the minimum (predetermined) pressure for operating the changeover valve 63 and thereby the clutch 35. Therefore the hatched zone in FIG. 4 shows the line pressure range for operation of the changeover valve 63.

The system further comprises a throttle back up valve 67 for delaying the operation when shifted to the 2-range or 1-range, and a downshift valve 68 actuated by a solenoid 62.

In operation, line pressure regulated by the pressure regulator valve 41 is applied to the manual valve 42 and the torque converter 2 to operate it. In a light load state in the D-range, the line pressure is low as shown in FIG. 4. Accordingly, the low line pressure is supplied to the forward clutch 17 through the manual valve 42. Thus, output power of the turbine shaft 10 is transmitted to the forward sun gear 15a. Since the carrier 15e is locked by the one-way clutch 22, the output shaft 23 rotates in the maximum reduction ratio. The rotation of the output shaft 23 is transmitted to the differential 28 by means of the reduction gear 27 and to the clutch means 6 through the shaft 33 and the transfer gear 34.

Since the line pressure is low, the plunger 63b of the changeover vave 63 is held in the right position (FIG. 3) so that the port 63e is closed and the ports 63f and 63g communicate with each other. Thus, the clutch 35 is in the disengaged state and hence only the front wheels are driven at the first-speed. When the governor pressure increases with an increase of the speed of the vehicle, the 1-2 shift valve 46 operates to supply the line pressure in the conduit 44 to the servo 20' of the brake 20 through the second lock valve 48 and the conduit 60 to clamp the brake 20. The reverse sun gear 15b is locked, so that the second-speed drive condition is established. When the governor pressure further increases, the 2-3 shift valve 49 is also actuated to supply the line pressure in the conduit 47 to the release side of the servo 20' and to the reverse clutch 18 through the conduit 61. Thus, the brake 20 is released and the reverse clutch 18 is applied, so that the automatic transmission becomes integrated to couple the turbine shaft 10 with the output shaft 23. Output of the engine is directly transmitted to the output shaft 23 as the third-speed drive condition. In a low speed state of the vehicle in such a condition, since the governor pressure applied to the right side of the pressure modifier valve 56 is low, the plunger is in a right end position to close the port 56b. Therefore, the throttle pressure acts on the pressure regulator valve 41 through the port 41b, so that line pressure is at a high level.

When the load of the engine increases and line pressure exceeds the line pressure $P_L$ in FIG. 4, the plunger 63b of the changeover valve 63 is moved to the left against the spring 63d to close the port 63g and to communicate ports 63e and 63f with each other. Thus, line pressure in the conduit 40 is applied to the clutch 35 to engage the drum 35a with the hub 35b, so that the rear wheels are driven by means of the rear drive shaft 31 and the propeller shaft 37. Thus, the vehicle is driven by the four-wheel drive. When the governor pressure increases as the speed of the vehicle increases, the plunger of the pressure modifier valve 56 is moved to the left to open the port 56b. Thus, throttle pressure is applied to the port 41c of the pressure regulator valve 41 through the conduit 59 to decrease the line pressure. As a consequence, the changeover valve 63 returns to the normal position to release the clutch, so that the system returns to the front-wheel drive.

When the 1-range or 2-range is selected, line pressure is also applied to the changeover valve 63 through the line 64. Thus, the four-wheel drive is automatically changed in the same manner as the previous operation.

In the R-range, the line pressure in the conduit 40 is applied to the low and reverse brake 16 through the valve 42 (in the position as illustrated in FIG. 3), conduit 51, the 1-2 shift valve 46 and the conduit 52, so that the low and reverse brake 16 is actuated. Further, the line pressure is applied to the reverse clutch 18 and the brake 20 via the conduit 53, the 2-3 shift valve 49 and the reverse range conduit 61. Thus, the output of the turbine shaft 10 is transmitted to the reverse sun gear 15b by means of the reverse clutch 18 and connecting shell 19. Since the carrier 15e is locked by the low and reverse brake 16, the output shaft 23 rotates in reverse at a large reduction ratio. In the R-range, line pressure from conduit 40 passes through the manual valve 42 (which is in the position illustrated in FIG. 3) to the conduit 53 and is applied to the port 63c of the changover valve 63 through the conduit 69. If the line pressure rises over the level $P_L$ according to the increase of the load, the changeover valve 63 is operated to communicate the conduit 40 with the clutch 35. Thus, the vehicle is driven in reverse with the front and rear wheels. When the line pressure lowers with a decrease of the load, the changeover valve 63 returns to the initial state to release the clutch 35 for the front wheel drive.

It will be understood that line pressure other than the line pressure in conduits 44 and 53 may be employed for actuating the changeover valve 63, and further the line pressure in the conduit 40, which has no relation to the operational range of the automatic transmission, may be employed.

In accordance with the present invention, since a multiple-disk clutch operated by line pressure in the automatic transmission is provided to transmit the output of the engine of the automotive vehicle to the rear wheels, changing operation from the drive condition of the front wheels to the four-wheel drive condition may be performed in any driving condition. Further, the transmission is automatically changed to the four-wheel drive in heavy load at a low speed of the vehicle, where the front wheels may be prone to slip. Thus, a driving manipulation may be facilitated and start accelerating ability and driveability may be improved. Since the multiple-disk clutch for driving the rear wheels are adapted to be operated by the line pressure of the automatic transmission, the construction may be simplified and it is easy to convert a front-wheel drive automatic transmission into a four-wheel drive system.

Since the clutch 35 is actuated by the line pressure, the capacity of the clutch varies with the variation of the engine load. Accordingly, the clutch acts also as a torque limitter. Thus, the torsional wind-up phenomenon in the power transmitting portion, which is caused by the difference between speeds of the front and rear wheel during four-wheel driving, may be relieved to protect the driving system. This further contributes to improvement of the driveability.

What is claimed is:

1. An automatic transmission for an automotive vehicle having an engine and a pair of front wheels and a pair of rear wheels, comprising a torque converter connected to a crank shaft of the engine of said automotive vehicle, an automatic transmission connected to a turbine shaft of said torque converter, said automatic transmission having a planetary gear, a plurality of fluid operated means for producing various operational ranges, and means including a final reduction gear for transmitting an output of said automatic transmission to the pair of front wheels, a pressure oil control means for operating said fluid operated means in said automatic transmission, said pressure oil control means including a pressure regulator valve to produce line pressure, a fluid operated clutch means for transmitting the output of said automatic transmission device to said pair of rear wheels, a changeover valve means for operatively connecting the line pressure to said fluid operated clutch means, said pressure oil control means for raising said line pressure with increase of load of the engine, and said changeover valve means for being actuated when said line pressure is raised for applying the raised line pressure to said clutch means.

2. The automatic transmission for an automotive vehicle according to claim 1, wherein said pressure oil control means for actuating said changeover valve means when said line pressure is raised in a forward driving condition.

3. The automatic transmission for an automotive vehicle according to claim 1, wherein said pressure oil control means for actuating said changeover valve means when said line pressure is raised in forward and reverse driving conditions, respectively.

4. The transmission as set forth in claim 1, wherein said clutch means is a fluid operated multiple-disk clutch.

5. In an automatic transmission for an automotive vehicle havng a pair of front wheels and a pair of rear wheels, a torque converter connected to a crank shaft of an engine of said automotive vehicle, an automatic transmission device connected to a turbine shaft of said torque converter, said automatic transmission device having a planetary gear and a plurality of fluid operated means for producing various operational ranges mounted on said automatic transmission device, a final reduction gear operatively connected between an output of said automatic transmission device and said pair of front wheels for transmitting the output of said automatic transmission device to the front wheels of said vehicle, a pressure oil control means for operating said fluid operated means in said automatic transmission device, said pressure oil control means including a manual valve movable into a plurality of positions for selecting transmission conditions of said automatic transmission device, a pressure regulator valve connected to a line pressure conduit for operatively connecting an oil pump with said manual valve to produce a line pressure according to an operational condition of the engine, a forward drive actuating conduit connecting said line pressure conduit to a forward clutch through said manual valve in a position of the latter, and a reverse range conduit connected to said line pressure conduit via said manual valve when the manual valve is selected to a reverse position, the improvement comprising a transmitting means including a normally disengaged fluid operated clutch means, when engaged for transmitting the output of said automatic transmission device to said pair of rear wheels, a changeover valve means including a normally closed port operatively connecting said line pressure conduit with said clutch means, and said changeover valve means when actuated, for opening said port for communicating said line pressure conduit with said clutch means, said changeover valve means including an end port connected with said forward drive actuating conduit, conduit means for connecting said end port with said reverse range conduit, said conduit means and said forward drive actuating conduit constitute pressure transmission lines, said pressure oil control means for raising said line pressure with increase of load of the engine in a forward driving condition and for increasing said line pressure in a reverse driving condition, respectively, and said changeover valve means for being actuated by said line pressure at said end port via one of said pressure transmission lines when the line pressure reaches a predetermined value so as to apply the line pressure from said line pressure conduit to said fluid operated clutch means, said fluid operated clutch means for engaging upon application of the line pressure from said line pressure conduit for four-wheel driving.

6. The automatic transmission for an automotive vehicle according to claim 5, wherein
said clutch means comprises a fluid operated multiple-disk clutch.

7. The automatic transmission for an automotive vehicle according to claim 5, wherein
said pressure oil control means for actuating said changeover valve means when said line pressure is raised to said predetermined value in the forward driving condition, wherein said one pressure transmission line is said forward drive actuating conduit.

8. The automatic transmission for an automotive vehicle according to claim 5, wherein
said pressure oil control means for actuating said changeover valve means when said line pressure is raised to said predetermined value in the forward and reverse driving conditions, respectively.

9. The automatic transmission for an automotive vehicle according to claim 5, wherein
said normally closed port of said changeover valve means connects with said line pressure conduit downstream from said pressure regulator valve.

* * * * *